(12) United States Patent
Yang et al.

(10) Patent No.: US 11,915,466 B2
(45) Date of Patent: Feb. 27, 2024

(54) METHOD AND APPARATUS FOR DETERMINING TARGET ANCHOR, DEVICE AND STORAGE MEDIUM

(71) Applicant: Beijing Baidu Netcom Science and Technology Co., Ltd., Beijing (CN)

(72) Inventors: Xipeng Yang, Beijing (CN); Xiao Tan, Beijing (CN); Hao Sun, Beijing (CN); Hongwu Zhang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 322 days.

(21) Appl. No.: 17/338,328

(22) Filed: Jun. 3, 2021

(65) Prior Publication Data

US 2021/0357683 A1 Nov. 18, 2021

(30) Foreign Application Priority Data

Oct. 22, 2020 (CN) .......................... 202011139167.8

(51) Int. Cl.
*G06T 7/246* (2017.01)
*G06V 10/44* (2022.01)
(Continued)

(52) U.S. Cl.
CPC .......... *G06V 10/454* (2022.01); *G06F 18/213* (2023.01); *G06T 7/215* (2017.01);
(Continued)

(58) Field of Classification Search
CPC .......... G06N 3/08; G06N 3/045; G06N 3/084; G06N 3/04; G06N 3/044;
(Continued)

(56) References Cited

U.S. PATENT DOCUMENTS 10,410,120 B1  9/2019  Kim et al.
11,244,191 B2 * 2/2022  Yao .................... G06V 10/7715
(Continued)

FOREIGN PATENT DOCUMENTS

CN  109801270 A  5/2019
CN  110211097 A  9/2019
(Continued)

OTHER PUBLICATIONS

Ren et al. "Faster R-CNN: Towards Real-Time Object Detection with Region Proposal Networks". In NIPS, 2015 (Year: 2015).*
(Continued)

*Primary Examiner* — Ian L Lemieux
(74) *Attorney, Agent, or Firm* — Kilpatrick Townsend & Stockton LLP

(57) ABSTRACT

Embodiments of the present disclosure disclose a method and apparatus for determining a target anchor, a device and a storage medium. The method may include: extracting a plurality of feature maps of an original image using a feature extraction network; inputting the plurality of feature maps into a feature pyramid network to perform feature fusion, to obtain a plurality of fused feature maps; and using a region proposal network to implement operations as follows: determining an initial anchor of a network head using the fused feature map, based on a size of each fused feature map, and determining an offset parameter of the initial anchor, based on a ratio of the size of the fused feature map to the original image, and generating a plurality of candidate anchors in different directions, based on the offset parameter of the initial anchor.

18 Claims, 4 Drawing Sheets

(51) Int. Cl.
- *G06T 7/215* (2017.01)
- *G06T 7/73* (2017.01)
- *G06F 18/213* (2023.01)
- *G06V 10/25* (2022.01)
- *G06V 30/19* (2022.01)
- *G06V 30/24* (2022.01)
- *G06V 10/82* (2022.01)

(52) U.S. Cl.
CPC .............. *G06T 7/246* (2017.01); *G06T 7/74* (2017.01); *G06V 10/25* (2022.01); *G06V 10/82* (2022.01); *G06V 30/19173* (2022.01); *G06V 30/2504* (2022.01); *G06T 2207/20016* (2013.01); *G06T 2207/20081* (2013.01); *G06V 2201/07* (2022.01)

(58) Field of Classification Search
CPC .......... G06T 2207/20016; G06T 11/60; G06T 2207/20081; G06T 5/20; G06T 7/11; G06T 7/215; G06T 7/246; G06T 7/70; G06T 7/74; G06T 2207/20084; G06T 2207/20221; G06T 7/0002; G06T 7/136; G06V 10/82; G06V 30/19173; G06V 10/25; G06V 10/454; G06V 2201/07; G06V 30/2504; G06V 20/10; G06V 20/70; G06V 30/274; G06F 18/213; G06F 18/22; G06F 18/241; G06F 18/24143; G06F 18/253

See application file for complete search history.

(56) References Cited

U.S. PATENT DOCUMENTS

| | | | |
|---|---|---|---|
| 2019/0057507 A1 | 2/2019 | El-Khamy et al. | |
| 2019/0347828 A1* | 11/2019 | Yang | G06V 10/245 |
| 2021/0295114 A1* | 9/2021 | Ye | G06F 16/5846 |

FOREIGN PATENT DOCUMENTS

| | | | | |
|---|---|---|---|---|
| CN | 110472539 A | | 11/2019 | |
| CN | 110796640 A | * | 2/2020 | |
| CN | 111027547 A | | 4/2020 | |
| CN | 111401380 A | * | 7/2020 | |
| CN | 110163187 B | * | 9/2022 | ......... G06K 9/00818 |
| WO | 2020/073310 A1 | | 4/2020 | |

OTHER PUBLICATIONS

Shi, Furong et al., "Orientation-Aware Vehicle Detection in Aerial Images via an Anchor-Free Object Detection Approach," IEEE Transactions on Geoscience and Remote Sensing, IEEE, USA, vol. 59, No. 6, pp. 5221-5233 (Aug. 6, 2020).

Liang, Zhenwen et al., "Small Object Detection Using Deep Feature Pyramid Networks," ICIAP: International Conference on Image Analysis and Processing, 17th International Conference, Naples, Italy, Sep. 9-13, 2013 Proceedings, pp. 554-564 (Sep. 18, 2018).

Lin, Tsung-Yi et al., "Feature Pyramid Networks for Object Detection," ARXIV.org, Cornell University Library, 201 Olin Library Cornell University Ithaca, NY 14853, pp. 1-10 (Dec. 9, 2016).

Yu, Yongtao et al., "Orientation guided anchoring for geospatial object detection from remote sensing imagery," ISPRS Journal of Photogrammetry and Remote Sensing, Amsterdam [U.A.] Elsevier, Amsterdam, NL, vol. 160, pp. 67-82 (Dec. 18, 2019).

European Search Report dated Dec. 1, 2021 of corresponding European Patent Application No. 21177313.0 (eleven pages).

* cited by examiner

METHOD AND APPARATUS FOR DETERMINING TARGET ANCHOR, DEVICE AND STORAGE MEDIUM

CROSS-REFERENCE TO RELATED APPLICATIONS

This application claims priority to Chinese Patent Application No. 202011139167.8, filed on Oct. 22, 2020, titled "Method and apparatus for determining target anchor, device and storage medium," which is hereby incorporated by reference in its entirety.

TECHNICAL FIELD

The present disclosure relates to the field of computer technology, in particular to the field of artificial intelligence technology such as computer vision and deep learning, and more particular to a method and apparatus for determining a target anchor, a device and a storage medium.

BACKGROUND

Generally, in an anchor-based deep learning target detection algorithm, setting of an anchor is fixed. A feature map used to detect a target output is smaller than an input size. Even with addition of a feature pyramid network, the largest feature map is usually downsampled 8 times of an input image. Each pixel point on the feature map represents an 8*8 region of an original image, and there may be a small-sized target on the original image, such as a 10*10 target, then a preset anchor may not be able to capture the target.

SUMMARY

Embodiments of the present disclosure provide a method and apparatus for determining a target anchor, a device and a storage medium.

According to a first aspect, an embodiment of the present disclosure provides a method for determining a target anchor, the method including: extracting a plurality of feature maps of an original image using a feature extraction network; inputting the plurality of feature maps into a feature pyramid network to perform feature fusion, to obtain a plurality of fused feature maps; and inputting the plurality of fused feature maps into a region proposal network respectively, and using the region proposal network to implement operations as follows: determining an initial anchor of a network head using the fused feature map, based on a size of each fused feature map, and determining an offset parameter of the initial anchor, based on a ratio of the size of the fused feature map to the original image, and generating a plurality of candidate anchors in different directions, based on the offset parameter of the initial anchor; and determining the target anchor from the plurality of candidate anchors.

According to a second aspect, an embodiment of the present disclosure provides an apparatus for determining a target anchor, the apparatus including: a feature map extraction module, configured to extract a plurality of feature maps of an original image using a feature extraction network; a feature fusion module, configured to input the plurality of feature maps into a feature pyramid network to perform feature fusion, to obtain a plurality of fused feature maps; and a target anchor generation module, configured to input the plurality of fused feature maps into a region proposal network respectively, and use the region proposal network to implement operations as follows: determining an initial anchor of a network head using the fused feature map, based on a size of each fused feature map, and determining an offset parameter of the initial anchor, based on a ratio of the size of the fused feature map to the original image, and generating a plurality of candidate anchors in different directions, based on the offset parameter of the initial anchor; and determining the target anchor from the plurality of candidate anchors.

According to a third aspect, an embodiment of the present disclosure provides an electronic device, including: at least one processor; and a memory communicatively connected to the at least one processor. The memory stores instructions executable by the at least one processor, the instructions, when executed by the at least one processor, cause the at least one processor to perform the method according to any implementation in the first aspect.

According to a fourth aspect, an embodiment of the present disclosure provides a non-transitory computer readable storage medium storing computer instructions, the computer instructions, being used to cause the computer to perform the method according to any implementation in the first aspect.

It should be understood that the content described in this section is not intended to identify key or important features of the embodiments of the present disclosure, nor is it intended to limit the scope of the present disclosure. Other features of the present disclosure will be easily understood by the following description.

BRIEF DESCRIPTION OF THE DRAWINGS

By reading the detailed description of non-limiting embodiments with reference to following accompanying drawings, other features, objectives and advantages of the present disclosure will become more apparent. The accompanying drawings are used to better understand the present solution, and do not constitute a limitation to the present disclosure.

DETAILED DESCRIPTION OF EMBODIMENTS

The present disclosure will be further described in detail below with reference to accompanying drawings and embodiments. It may be understood that the embodiments described herein are only used to explain the relevant disclosure, but not to limit the disclosure. In addition, it should be noted that, for ease of description, only the parts related to the relevant disclosure are shown in the accompanying drawings.

It should be noted that embodiments in the present disclosure and the features in the embodiments may be combined with each other on a non-conflict basis. The present disclosure will be described below in detail with reference to the accompanying drawings and in combination with the embodiments.

In the existing art, in an anchor-based deep learning target detection algorithm, setting of an anchor is fixed. For example, a feature map is downsampled 8 times of an input image. In this regard, each pixel point on a network head in a region candidate network represents an 8*8 region of an original image. If there is a small-sized target on the original image, for example, a 10*10 target, and the target does not fall in a predicted center of the feature map, a preset anchor may not be able to capture the target, resulting in missed matches. Similarly, if there are intensive targets that need to be matched on pixels of a same feature map, and there are not enough best matching anchors around, it may eventually cause missed detection or big errors in classification and regression.

In view of this, embodiments of the present disclosure provide a method and apparatus for determining a target anchor, a device and a storage medium.

Figure 1:
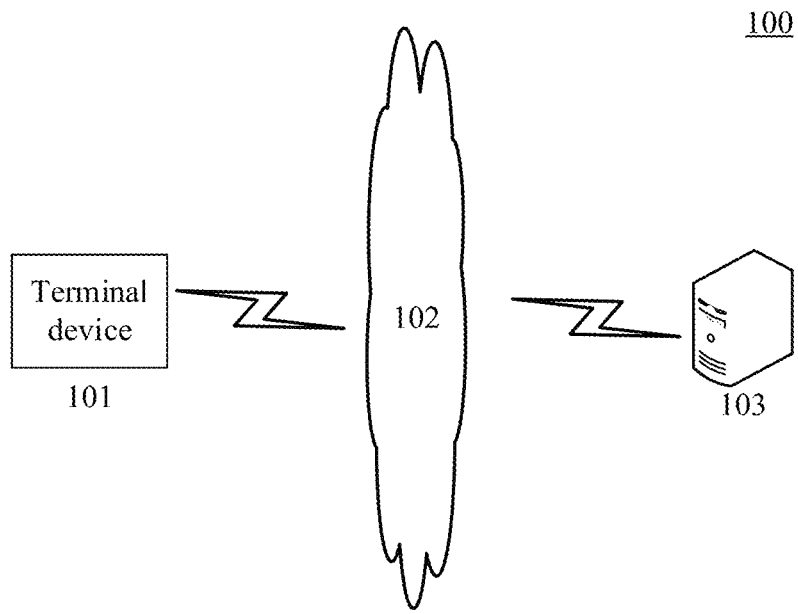
FIG. 1 is an example system architecture diagram to which embodiments of the present disclosure may be implemented.

FIG. 1 shows an example system architecture 100 to which embodiments of a method for determining a target anchor or an apparatus for determining a target anchor of the present disclosure may be implemented.

As shown in FIG. 1, the system architecture 100 may include a terminal device 101, a network 102, and a server 103. The network 102 is used to provide a communication link medium between the terminal device 101 and the server 103. The network 102 may include various connection types, such as wired, wireless communication links, or optic fibers.

The terminal device 101 may interact with the server 103 through the network 102. An original image may be provided in the terminal device 101, including but not limited to a database, a user terminal, and so on.

The server 103 may provide various services. For example, the server 103 may process such as analyze the original image and other data acquired from the terminal device 101 to generate a processing result (for example, a plurality of candidate anchors in different directions).

It should be noted that the server 103 may be hardware or software. When the server 103 is hardware, it may be implemented as a distributed server cluster composed of a plurality of servers, or as a single server. When the server 103 is software, it may be implemented as a plurality of pieces of software or a plurality of software modules (for example, to provide distributed services), or may be implemented as a single piece of software or a single software module, which is not limited herein.

It should be noted that the method for determining a target anchor provided in embodiments of the present disclosure is generally performed by the server 103. Correspondingly, the apparatus for determining a target anchor is generally provided in the server 103.

It should be understood that the number of terminal devices, networks, and servers in FIG. 1 is merely illustrative. Depending on the implementation needs, there may be any number of terminal devices, networks, and servers.

Figure 2:
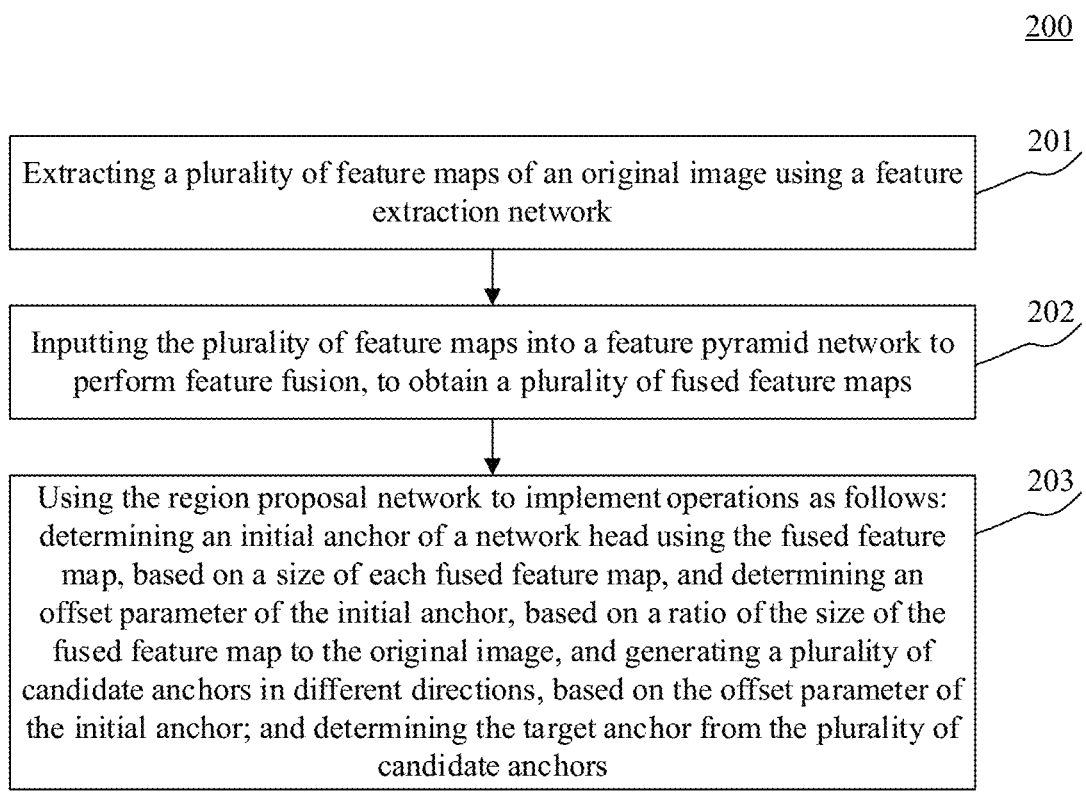
FIG. 2 is a schematic flowchart of a method for determining a target anchor according to an embodiment of the present disclosure.

With further reference to FIG. 2, illustrating a flow 200 of a method for determining a target anchor according to an embodiment of the present disclosure. The method includes the following steps.

Step 201, extracting a plurality of feature maps of an original image using a feature extraction network.

In the present embodiment, an executing body of the method for determining a target anchor (for example, the server 103 shown in FIG. 1) may extract the plurality of feature maps of the original image using the feature extraction network.

The feature extraction network refers to a network structure that may extract image-level features, such as a backbone network. The feature extraction network may use Resnet series or Darknet series. The Resnet series include resnet34, resnet50, resent101, etc., and the Darknet series include darkNet19, darknet53, etc.

The feature extraction network of an appropriate size may be selected according to different business application scenarios. For example, a lightweight structure may choose resnet18, resnet34, darknet19, a medium structure may choose resnet50, resneXt50, darknet53, and a heavy structure may choose resent101, resneXt152 and so on.

For example, a Resnet network may be used to extract a feature of the original image, and feature maps output by a plurality of convolutional layers in the Resnet network may be used as the plurality of feature maps of the original image. Based on a different sampling ratio to the original image by the feature extraction network, the size of the corresponding feature map is also different.

For example, if the original image is downsampled 8 times, the size of the corresponding feature map is ⅛ of the original image; if the original image is downsampled 16 times, the size of the corresponding feature map is 1/16 of the original image; or if the original image is downsampled 32 times, the size of the corresponding feature map is 1/32 of the original image.

Step 202, inputting the plurality of feature maps into a feature pyramid network to perform feature fusion, to obtain a plurality of fused feature maps.

In the present embodiment, the executing body may input the plurality of feature maps into the feature pyramid network to perform feature fusion, to obtain the plurality of fused feature maps. Feature pyramid network (FPN) fusion refers to a progressive fusion from high-level features to low-level features using top-down connections.

Low-level feature maps in the plurality of feature maps obtained by performing step 201 are suitable for checking large targets, while high-level feature maps are suitable for detecting small targets. In order to be able to identify small targets more accurately, a feature pyramid structure may be used to fuse features at different levels. The high-level feature maps have smaller sizes and deep semantic information, and the low-level feature maps have larger sizes and shallow semantic information.

For example, the feature extraction network may connect to an FPN structure where the sampling ratio is ⅛, 1/16, and 1/32 of the input image, respectively, to perform information fusion between different levels. By performing FPN fusion on feature maps at different levels, shallow semantic information and deep semantic information may be combined.

Step 203, inputting the plurality of fused feature maps into a region proposal network respectively, and using the region proposal network to implement operations as follows: determining an initial anchor of a network head using the fused feature map, based on a size of each fused feature map, and determining an offset parameter of the initial anchor, based on a ratio of the size of the fused feature map to the original image, and generating a plurality of candidate anchors in different directions, based on the offset parameter of the initial anchor; and determining the target anchor from the plurality of candidate anchors.

In the present embodiment, region proposal network (RPN) is a network used to extract the candidate anchors. A head of the region proposal network is used to generate anchors. A middle part of the region proposal network is used to calculate the anchors respectively through a classification branch and a border regression branch. At an end of the region proposal network, results of the two branches are summarized to achieve screening of the anchors.

After inputting the plurality of fused feature maps into the region proposal network respectively, N (N>=1) anchors of different sizes may be set for the feature map of each size. A shallow network head has a larger feature map size, and the shallow network head predicts small-sized targets and may allocate small-sized anchors.

Similarly, a deep network head has a smaller feature map size, and the deep network head predicts large-sized targets and may allocate large-sized anchors. For example, if the FPN structure includes 3 layers of feature maps, the corresponding sizes are ⅛, 1/16, 1/32 of the input image respectively, for instance, if N=1, then an anchor may be predefined for each size, where the ⅛ feature map mainly predicts small-sized targets, and the anchor size is the smallest; the 1/16 feature map mainly predicts medium-sized targets, and the anchor size is medium; and the 1/32 feature map mainly predicts large-sized targets, that is, the anchor size is the largest. The predefined anchor based on the size of each feature map is the initial anchor of the network head using the feature map.

Figure 3:
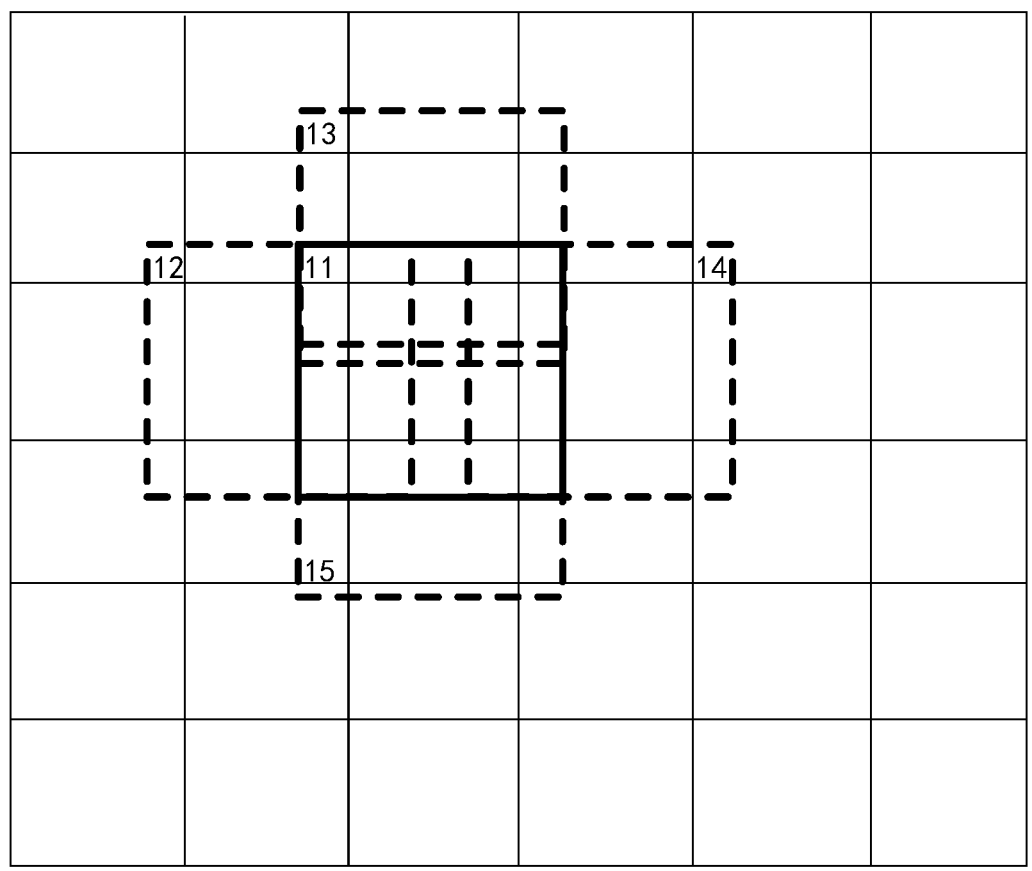
FIG. 3 is a schematic diagram of a plurality of candidate anchors generated according to an embodiment of the present disclosure.

In the present embodiment, after the predefined anchor is confirmed, the offset parameter of the initial anchor may be determined based on the ratio of the size of the fused feature map to the original image, and based on the offset parameter of the initial anchor, the plurality of candidate anchors in different directions may be generated. For example, as shown in FIG. 3, if the size of the feature map in the network head is ⅛ times of the input image, then an initial anchor 11 here translates a corresponding translation distance to the left, right, up, down, and generates 4 new anchors, where, translating to the left generates a new anchor 12, translating to the right generates a new anchor 14, translating up generates a new anchor 13, and translating down generates a new anchor 15. Finally, these 4 new anchors are used as 4 candidate anchors.

After the plurality of candidate anchors are determined, the desired target anchor may be selected according to the needs of target detection. The middle part of the region proposal network is used to calculate the plurality of candidate anchors through the classification branch and the border regression branch, and then at the end of the region proposal network, the results of the two branches are summarized to achieve the screening of the anchors, so as to select the desired target anchor.

The method for determining a target anchor provided by the above embodiment of the present disclosure, based on the predefined anchor, performs an anchor offset operation based on the multiple of downsampling, and generates some new anchors on each pixel of the feature map in the network head. In this way, the number of effective anchors may be dynamically increased based on the size of the feature map, and the problem of misdetection in small targets and target-intensive scenarios may be alleviated.

In some alternative implementations of the present embodiment, the method for determining a target anchor further includes: selecting, based on sizes of intersection over union (IOU) of the initial anchor and the plurality of candidate anchors with a ground truth, at least one anchor corresponding to an IOU that meets a preset threshold as a to-be-selected anchor.

After determining the initial anchor and the plurality of candidate anchors on each fused feature map according to the above step 203, the ground truth (gt) and the anchors may be matched to determine positive and negative samples.

Top k (adjustable parameter) anchors with the largest IOU may be selected as the to-be-selected anchor based on the sizes of the IOU between the ground truth and the anchors.

If a given anchor matches different ground truths, a ground truth having the largest IOU with the anchor may be selected, and this anchor is used as the to-be-selected anchor of the ground truth. Alternatively, if a center point of the ground truth is not at the anchor, the anchor may be excluded, thereby improving the effectiveness of the anchor.

In some alternative implementations of the present embodiment, after acquiring the to-be-selected anchor(s) from the initial anchor and the plurality of candidate anchors, non-maximum suppression may be used to select the target anchor from the to-be-selected anchor(s).

Here, non-maximum suppression (NMS) is to suppress elements that are not maximum values. For example, in target detection, anchors are extracted with features, and after classification and identification by a classifier, each anchor may get a score. But there may be inclusion or cross of most parts situation between anchors. In this regard, it is necessary to use NMS to select those anchors having the highest scores in the neighborhood and suppress those anchors having low scores, so as to select optimal anchors and improve the accuracy of target detection.

In some alternative implementations of the present embodiment, the offset parameters of the initial anchor includes a translation direction of the initial anchor and a translation distance of the initial anchor.

The translation direction refers to a movement direction of the initial anchor, such as up, down, left, right, or the like. The translation distance refers to a movement distance of the initial anchor, such as 4 pixels, 8 pixels, or the like.

Alternatively, a size of the ratio of the size of the fused feature map used by the network head to the original image is in a functional mapping relationship with a size of the translation distance of the initial anchor.

For example, if the ratio of the size of the feature map to the original image is $1/2^N$, where N is a positive integer, then the translation distance of the initial anchor corresponding to the feature map is $(0-2^N)$ pixels.

Figure 4:
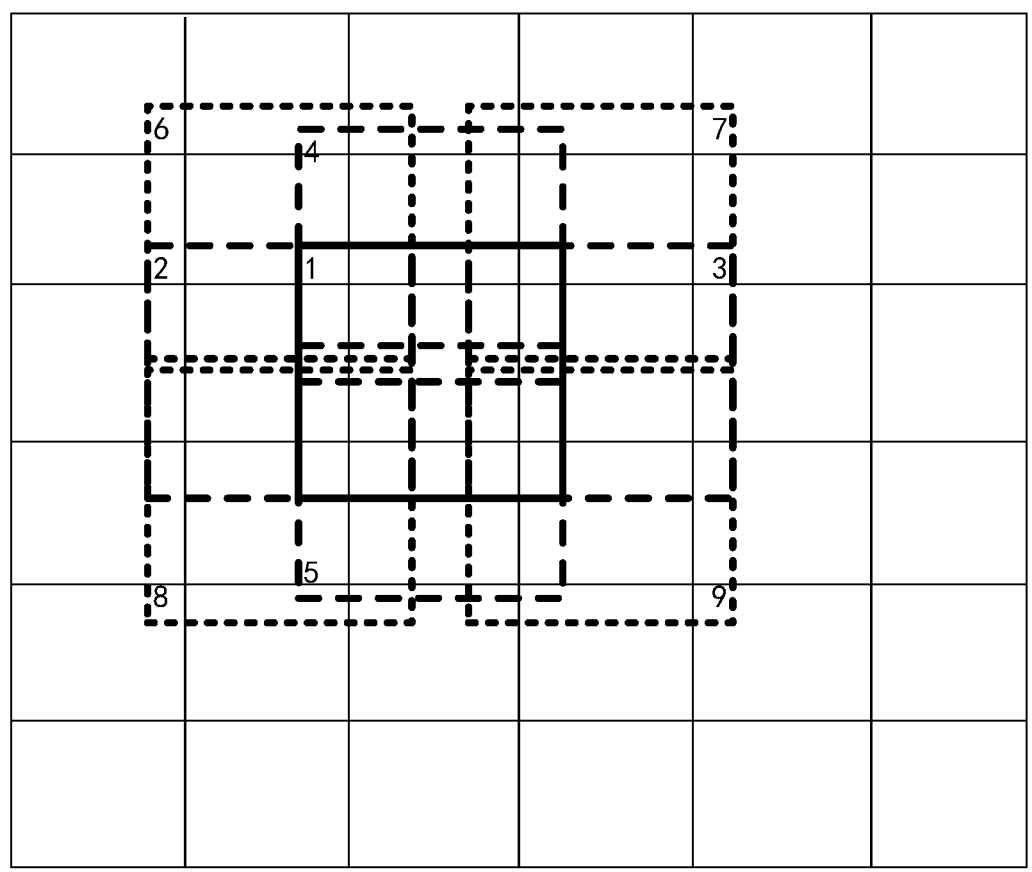
FIG. 4 is a schematic diagram of a plurality of candidate anchors generated according to another embodiment of the present disclosure.

With further reference to FIG. 4, FIG. 4 is a schematic diagram of a plurality of candidate anchors generated according to another embodiment of the present disclosure. As shown in FIG. 4, if the size of the feature map in the network head is ⅛ times of the input image, for more effective anchor allocation, an initial anchor 1 here may also be translated up, down, left, right, upper left, lower left, upper right, and lower right by a corresponding translation distance respectively to generate 8 new anchors, where, translating to the left generates a new anchor 2, translating to the right generates a new anchor 3, translating up generates a new anchor 4, translating down generates a new anchor 5, translating to the upper left generates a new anchor 6, translating to the lower left generates a new anchor 8, translating to the upper right generates a new anchor 7, and translating to the lower right generates a new anchor 9. Finally, these 8 new anchors are used as 8 candidate anchors.

Figure 5:
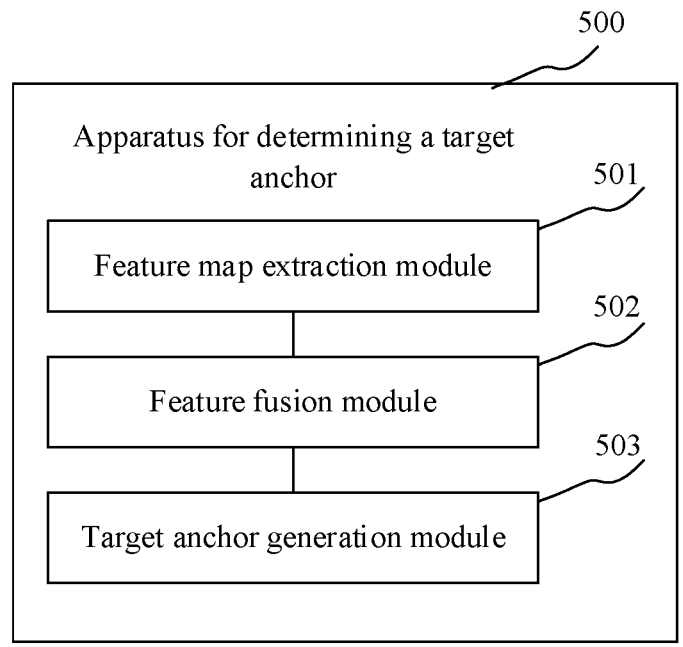
FIG. 5 is a schematic structural diagram of an apparatus for determining a target anchor according to an embodiment of the present disclosure.

With further reference to FIG. 5, as an implementation of the method shown in the above figures, an embodiment of the present disclosure provides an apparatus for determining a target anchor, and the apparatus embodiment corresponds to the method embodiment as shown in FIG. 2. The apparatus may be specifically applied to various electronic devices.

As shown in FIG. 5, an apparatus 500 for determining a target anchor of the present embodiment may include: a feature map extraction module 501, a feature fusion module 502, a target anchor generation module 503. The feature map extraction module 501 is configured to extract a plurality of feature maps of an original image using a feature extraction network. The feature fusion module 502 is configured to input the plurality of feature maps into a feature pyramid network to perform feature fusion, to obtain a plurality of fused feature maps. The target anchor generation module 503 is configured to input the plurality of fused feature maps into a region proposal network respectively, and use the region proposal network to implement operations as follows: determining an initial anchor of a network head using the fused feature map, based on a size of each fused feature map, and determining an offset parameter of the initial anchor, based on a ratio of the size of the fused feature map to the original image, and generating a plurality of candidate anchors in different directions, based on the offset parameter of the initial anchor; and determining the target anchor from the plurality of candidate anchors.

In the present embodiment, in the apparatus 500 for determining a target anchor: for the specific processing and technical effects thereof of the feature map extraction module 501, the feature fusion module 502, the target anchor generation module 503, reference may be made to the relevant description of steps 201-205 in the corresponding embodiment of FIG. 2 respectively, and repeated description thereof will be omitted.

In some alternative implementations of the present embodiment, the target anchor generation module is further configured to: select, from the initial anchor and the plurality of candidate anchors, based on sizes of intersection over union of the initial anchor and the plurality of candidate anchors with a ground truth, at least one anchor corresponding to an intersection over union meeting a preset threshold as a to-be-selected anchor; and determine the target anchor, based on the to-be-selected anchor.

In some alternative implementations of the present embodiment, the target anchor generation module is further configured to: select the target anchor from the to-be-selected anchor, using non-maximum suppression.

In some alternative implementations of the present embodiment, the offset parameter of the initial anchor includes a translation direction of the initial anchor and a translation distance of the initial anchor.

In some alternative implementations of the present embodiment, a size of the ratio of the size of the fused feature map used by the network head to the original image is in a functional mapping relationship with a size of the translation distance of the initial anchor.

In some alternative implementations of the present embodiment, the translation direction of the initial anchor includes at least one of: up, down, left, right, top left, bottom left, top right, or bottom right.

Figure 6:
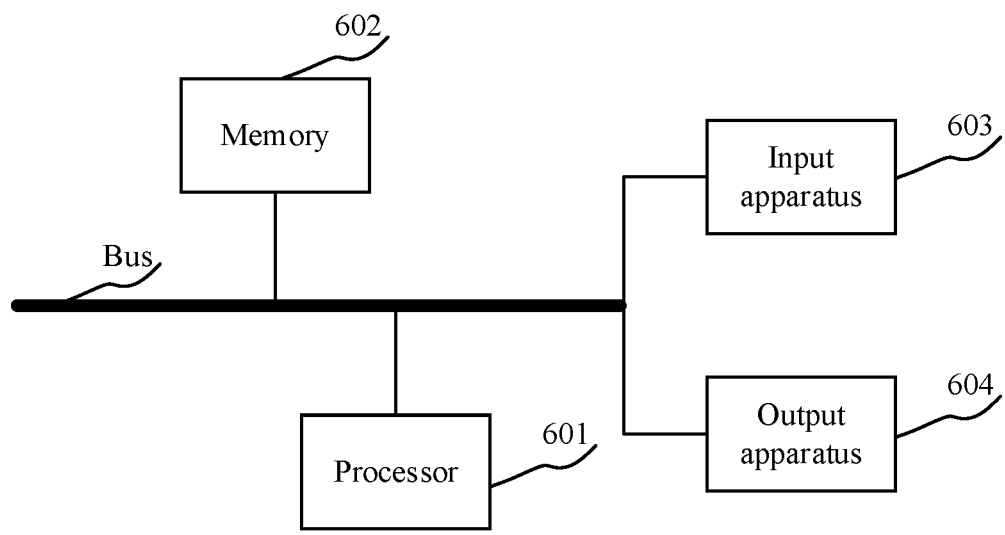
FIG. 6 is a block diagram of an electronic device used to implement the method for determining a target anchor according to embodiments of the present disclosure.

As shown in FIG. 6, is a block diagram of an electronic device of the method for determining a target anchor according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations (for example, as a server array, a set of blade servers, or a multi-processor system). In FIG. 6, one processor 601 is used as an example.

The memory 602 is a non-transitory computer readable storage medium provided by the present disclosure. The memory stores instructions executable by at least one processor, so that the at least one processor performs the method for determining a target anchor provided by embodiments of the present disclosure. The non-transitory computer readable storage medium of the present disclosure stores computer instructions for causing a computer to perform the method for determining a target anchor provided by embodiments of the present disclosure.

The memory 602, as a non-transitory computer readable storage medium, may be used to store non-transitory software programs, non-transitory computer executable programs and modules, such as program instructions/modules corresponding to the method for determining a target anchor in the embodiments of the present disclosure (for example, the feature map extraction module 501, the feature fusion module 502, the target anchor generation module 503 as shown in FIG. 5). The processor 601 executes the non-transitory software programs, instructions, and modules stored in the memory 602 to execute various functional applications and data processing of the server, that is, to implement the method for determining a target anchor in the foregoing method embodiments.

The memory 602 may include a storage program area and a storage data area, where the storage program area may store an operating system and at least one function required application program; and the storage data area may store data created by the use of the electronic device according to the method for determining a target anchor, etc. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device of the method for determining a target anchor through a network. Examples of the above network include but are not limited to the Internet, intranet, local area network, mobile communication network, and combinations thereof.

The electronic device of the method for determining a target anchor may further include: an input apparatus 603 and an output apparatus 604. The processor 601, the memory 602, the input apparatus 603, and the output apparatus 604 may be connected through a bus or in other methods. In FIG. 6, connection through a bus is used as an example.

The input apparatus 603 may receive input digital or character information, and generate key signal inputs related to user settings and function control of the electronic device of the method for determining a target anchor, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

The technical solution according to embodiments of the present disclosure may first extract a plurality of feature maps of an original image using a feature extraction network; then input the plurality of feature maps into a feature pyramid network to perform feature fusion, to obtain a plurality of fused feature maps; and finally input the plurality of fused feature maps into a region proposal network respectively, and use the region proposal network to implement operations as follows: determining an initial anchor of a network head using the fused feature map, based on a size of each fused feature map, and determining an offset parameter of the initial anchor, based on a ratio of the size of the fused feature map to the original image, and generating a plurality of candidate anchors in different directions, based on the offset parameter of the initial anchor; and determining the target anchor from the plurality of candidate anchors, thereby dynamically increasing the number of effective anchors based on the size of the feature map, and alleviating the problem of misdetection in small targets and target-intensive scenarios.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for determining a target anchor, the method comprising:
    extracting a plurality of feature maps of an original image using a feature extraction network;
    inputting the plurality of feature maps into a feature pyramid network to perform feature fusion to obtain a plurality of fused feature maps;
    inputting the plurality of fused feature maps into a region proposal network respectively; and using the region proposal network to implement operations as follows:
  determining an initial anchor of a network head using the fused feature map based on a size of each fused feature map;
  determining an offset parameter of the initial anchor based on a ratio of the size of the fused feature map to the original image;
  generating a plurality of candidate anchors in different directions based on the offset parameter of the initial anchor; and
  determining the target anchor from the plurality of candidate anchors.

2. The method according to claim 1, wherein determining the target anchor from the plurality of candidate anchors comprises:
  selecting, from the initial anchor and the plurality of candidate anchors based on sizes of intersection over a union, of the initial anchor and the plurality of candidate anchors, with a ground truth, at least one anchor corresponding to an intersection over union meeting a preset threshold as a to-be-selected anchor; and
  determining the target anchor based on the to-be-selected anchor.

3. The method according to claim 2, wherein determining the target anchor based on the to-be-selected anchor comprises:
  selecting the target anchor from the to-be-selected anchor using non-maximum suppression.

4. The method according to claim 1, wherein the offset parameter of the initial anchor comprises a translation direction of the initial anchor and a translation distance of the initial anchor.

5. The method according to claim 4, wherein a size of the ratio of the size of the fused feature map used by the network head to the original image is in a functional mapping relationship with a size of the translation distance of the initial anchor.

6. The method according to claim 4, wherein the translation direction of the initial anchor comprises at least one of:
  up, down, left, right, top left, bottom left, top right, or bottom right.

7. An electronic device, comprising:
  at least one processor; and
  a memory, communicatively connected to the at least one processor;
  wherein the memory stores instructions executable by the at least one processor, the instructions, when executed by the at least one processor, cause the at least one processor to perform operations, comprising:
  extracting a plurality of feature maps of an original image using a feature extraction network;
  inputting the plurality of feature maps into a feature pyramid network to perform feature fusion, to obtain a plurality of fused feature maps;
  inputting the plurality of fused feature maps into a region proposal network respectively; and
  using the region proposal network to implement operations as follows:
    determining an initial anchor of a network head using the fused feature map based on a size of each fused feature map;
    determining an offset parameter of the initial anchor based on a ratio of the size of the fused feature map to the original image;
    generating a plurality of candidate anchors in different directions based on the offset parameter of the initial anchor; and
    determining a target anchor from the plurality of candidate anchors.

8. The electronic device according to claim 7, wherein determining the target anchor from the plurality of candidate anchors comprises:
  selecting, from the initial anchor and the plurality of candidate anchors based on sizes of intersection over union of the initial anchor and the plurality of candidate anchors with a ground truth, at least one anchor corresponding to an intersection over a union meeting a preset threshold as a to-be-selected anchor; and
  determining the target anchor based on the to-be-selected anchor.

9. The electronic device according to claim 8, wherein determining the target anchor based on the to-be-selected anchor comprises:
  selecting the target anchor from the to-be-selected anchor using non-maximum suppression.

10. The electronic device according to claim 7, wherein the offset parameter of the initial anchor comprises a translation direction of the initial anchor and a translation distance of the initial anchor.

11. The electronic device according to claim 10, wherein a size of the ratio of the size of the fused feature map used by the network head to the original image is in a functional mapping relationship with a size of the translation distance of the initial anchor.

12. The electronic device according to claim 10, wherein the translation direction of the initial anchor comprises at least one of:
  up, down, left, right, top left, bottom left, top right, or bottom right.

13. A non-transitory computer readable storage medium, storing computer instructions, the computer instructions, when executed by at least one processor, cause the at least one processor to perform operations, comprising:
  extracting a plurality of feature maps of an original image using a feature extraction network;
  inputting the plurality of feature maps into a feature pyramid network to perform feature fusion to obtain a plurality of fused feature maps;
  inputting the plurality of fused feature maps into a region proposal network respectively; and
  using the region proposal network to implement operations as follows:
    determining an initial anchor of a network head using the fused feature map based on a size of each fused feature map;
    determining an offset parameter of the initial anchor based on a ratio of the size of the fused feature map to the original image;
    generating a plurality of candidate anchors in different directions, based on the offset parameter of the initial anchor; and
    determining a target anchor from the plurality of candidate anchors.

14. The non-transitory computer readable storage medium according to claim 13, wherein determining the target anchor from the plurality of candidate anchors comprises:
  selecting, from the initial anchor and the plurality of candidate anchors based on sizes of intersection over union of the initial anchor and the plurality of candidate anchors with a ground truth, at least one anchor corresponding to an intersection over union meeting a preset threshold as a to-be-selected anchor; and determining the target anchor based on the to-be-selected anchor.

15. The non-transitory computer readable storage medium according to claim 14, wherein determining the target anchor based on the to-be-selected anchor comprises:

selecting the target anchor from the to-be-selected anchor using non-maximum suppression.

16. The non-transitory computer readable storage medium according to claim 13, wherein the offset parameter of the initial anchor comprises a translation direction of the initial anchor and a translation distance of the initial anchor.

17. The non-transitory computer readable storage medium according to claim 16, wherein a size of the ratio of the size of the fused feature map used by the network head to the original image is in a functional mapping relationship with a size of the translation distance of the initial anchor.

18. The non-transitory computer readable storage medium according to claim 16, wherein the translation direction of the initial anchor comprises at least one of:

up, down, left, right, top left, bottom left, top right, or bottom right.

* * * * *